Jan. 14, 1964     C. G. GORDON     3,117,594
ELECTRO-HYDRAULIC SERVO VALVE
Filed Aug. 27, 1959     2 Sheets-Sheet 2
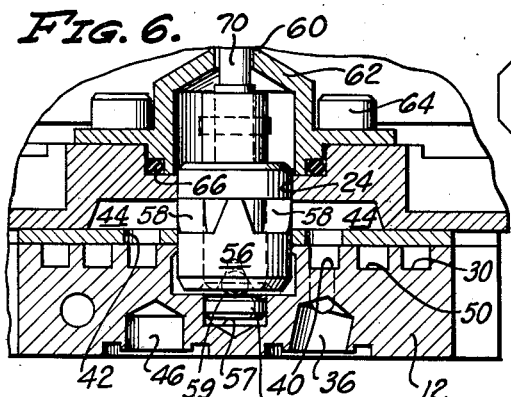
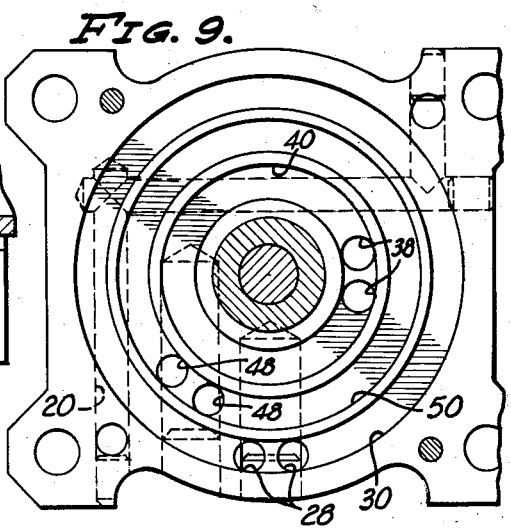
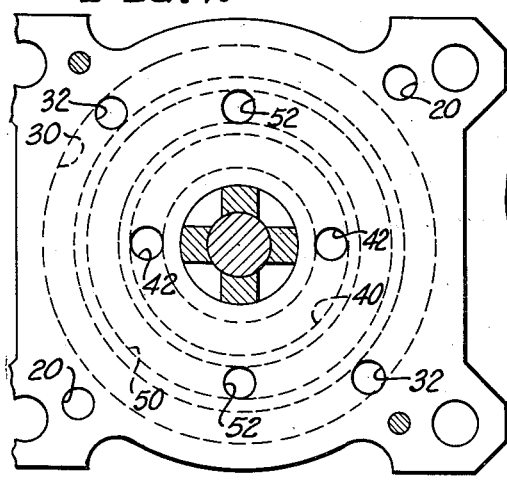
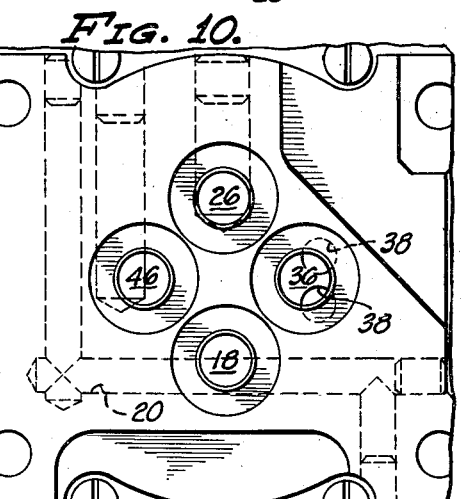
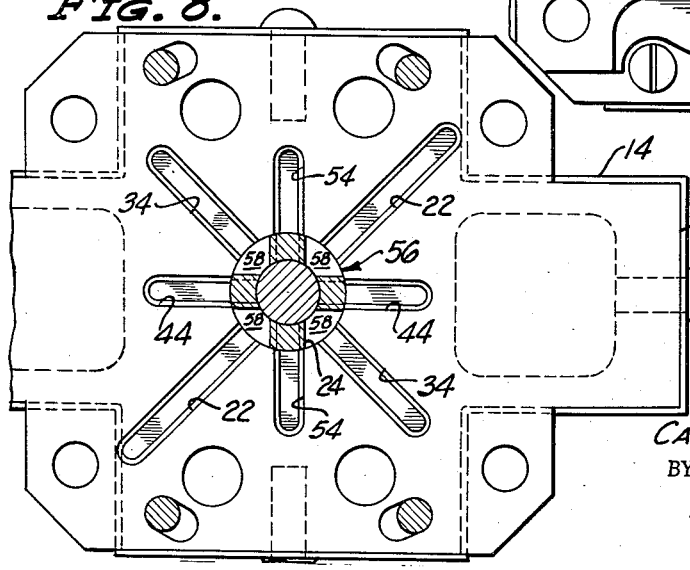
INVENTOR.
CARROLL G. GORDON
BY
ATTORNEY

United States Patent Office 3,117,594
Patented Jan. 14, 1964

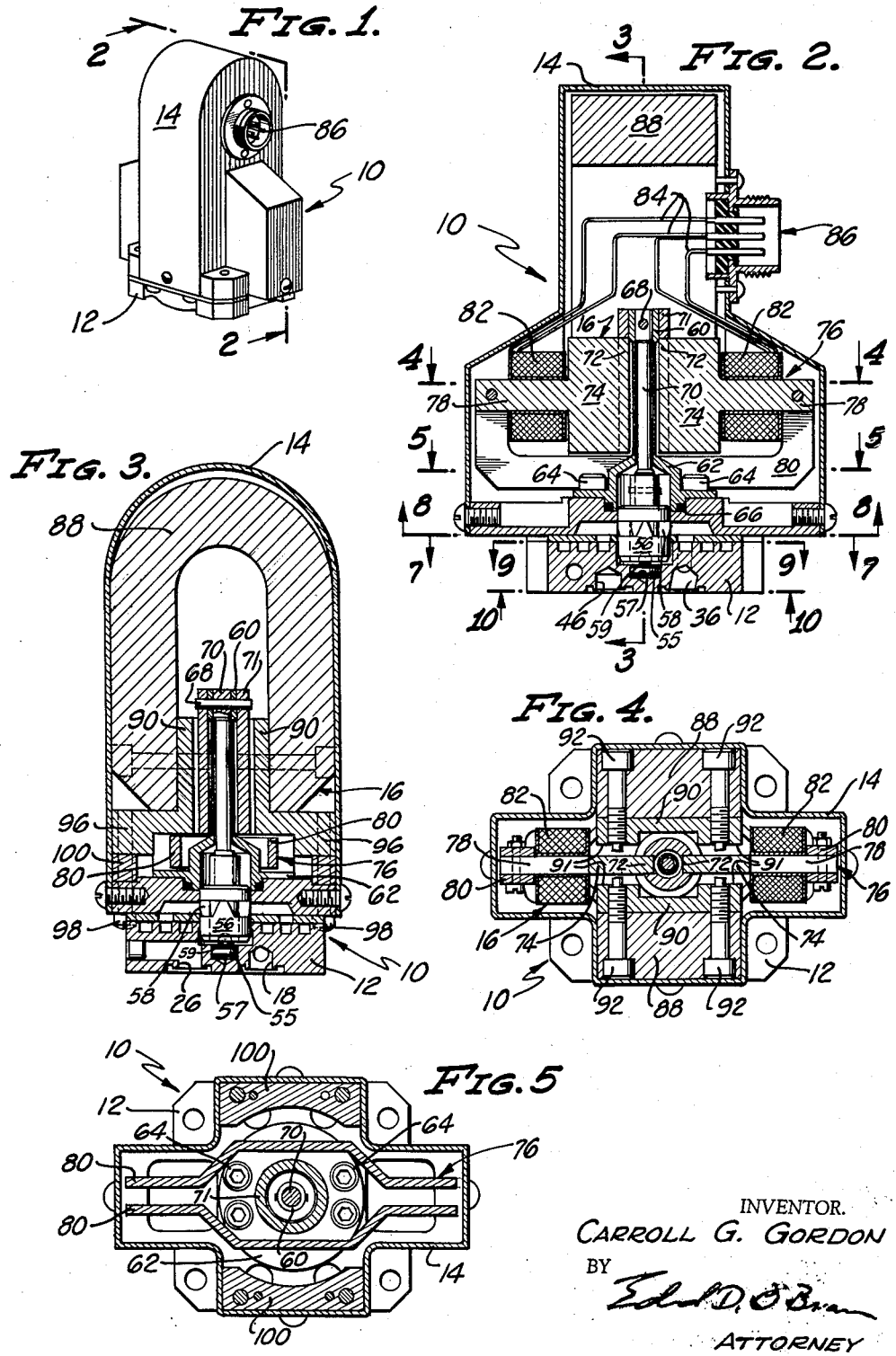

3,117,594
ELECTRO-HYDRAULIC SERVO VALVE
Carroll G. Gordon, 3 Williams Court, Menlo Park, Calif.
Filed Aug. 27, 1959, Ser. No. 836,504
3 Claims. (Cl. 137—625.65)

This invention pertains to new and improved electro-hydraulic servo valves.

Electro-hydraulic servo valves are commonly used at the present time wherever it is desired to control the flow of hydraulic fluid by using an electrical signal. A number of such valves are commonly available at the present time. While the vast majority of such valves are suitable for the purpose intended, many of them suffer from a number of inherent limitations and disadvantages. Frequently these prior valves have been relatively complex. In the past, as a consequence of this relative complexity, they have tended to be relatively expensive and to a certain extent unreliable in operation.

As an example of this in the co-pending application Serial No. 766,168, now Patent Number 2,961,002, filed September 29, 1958 there are described several electro-hydraulic servo valves which are very efficient for the purpose intended and which perform satisfactorily for most purposes. However, valves as described in this co-pending application suffer from several limitations which at least tend to limit their acceptability. Electro-hydraulic servo valves as described in this co-pending application use a hydraulic amplifier which is actuated by an electrical signal so as to actuate a type of piston which in turn rotates a balanced type of valve rotor. Such hydraulic amplifiers use comparatively small orifices and nozzles, and employ a flapper which must operate within a comparatively small area. As a result of the small dimensions of these parts in valves as described in this co-pending application, it is necessary to use these valves only with extremely clean oil in order to guarantee proper valve functioning at all times and in order to provide for dependability of performance. Obviously this limits the acceptability of such valves for many applications.

An object of this invention is to provide new and improved electro-hydraulic servo valves which are a definite improvement over the aforegoing and related valves of similar nature. A further object of this invention is to provide electro-hydraulic servo valves which may be manufactured at a comparatively nominal cost, which are extremely reliable in operation, and which are substantially incapable of mal-operation resulting from accumulation of dirt or other extraneous material passing through the hydraulic fluid controlled by such a valve. A still further object of this invention is to provide electro-hydraulic servo valves in which an electrical signal or input is used directly so as to move or actuate a valve rotor in order to control the operation of such a valve.

These and other objects of this invention will be fully apparent to those skilled in the art to which this invention pertains from a detailed consideration of the remainder of this description including the appended claims and the accompanying drawings in which:

FIG. 1 is a perspective view of an electro-hydraulic servo valve of this invention;

FIG. 2 is a cross-sectional view taken at line 2—2 of FIG. 1;

FIG. 3 is a cross-sectional view taken at line 3—3 of FIG. 2;

FIG. 4 is a cross-sectional view taken at line 4—4 of FIG. 2;

FIG. 5 is a cross-sectional view taken at line 5—5 of FIG. 2;

FIG. 6 is an enlarged cross-sectional view corresponding to part of FIG. 2;

FIG. 7 is a cross-sectional view taken at line 7—7 of FIG. 2;

FIG. 8 is a cross-sectional view taken at line 8—8 of FIG. 2;

FIG. 9 is a cross-sectional view taken at line 9—9 of FIG. 2;

FIG. 10 is a bottom plan view taken at line 10—10 of FIG. 2; and

FIG. 11 is a diagrammatic view showing the shape of certain parts employed in this valve.

It is to be understood that the accompanying drawings are not to be taken as limiting this invention in any respect. Those skilled in the art to which this invention pertains will realize that a variety of differently appearing electro-hydraulic servo valves falling within the scope of this disclosure may be designed through the exercise of routine engingeering skill using the general type of construction explained in this specification.

As an aid to the understanding of this invention it can be stated in essentially summary form that it concerns electro-hydraulic servo valves, each of which includes a valve body having a plurality of passages or ports leading to a cavity within which there is disposed a valve rotor capable of connecting certain of these passages or ports when the rotor is turned. Preferably this valve construction is of a balanced category so that the forces on all sides of the rotor are substantially equal at all times in order to prevent binding of the rotor when the valve is used at extremely high pressures. With a valve of this invention the rotor itself is rotated through the use of a shaft, an extremity of which remote from the valve body is secured to a corresponding end of a torque tube, the other end of which is secured to the valve body so as to provide a sealed structure. A torque motor is attached to this torque tube, and, hence, is connected to the shaft used for the purpose of turning the valve rotor itself in response to an electrical signal applied to the torque motor.

The actual nature of this type of valve is best and more fully explained by referring directly to the accompanying drawings. There in the drawings is shown a complete electro-hydraulic servo valve 10 of this invention which includes a base 12 serving as a valve body. A non-magnetic protective cover 14 is attached to one side of this base 12 so as to encase what may be described as a complete torque motor 16 mounted upon the base 12.

The base 12 includes a port 18 (FIGS. 3 and 10) designed to be connected to a source of high pressure hydraulic fluid. This port leads through the cross-passages 22 (FIG. 8) located on opposite sides of the axis of a cylindrical valve cavity 24. A return port 26 (FIGS. 3 and 10) in the base 12 leads through the holes 28 (FIG. 9) to an annular groove 30 leading around the valve cavity 24. Other holes 32 (FIG. 7) lead from the groove 30 to return passages 34 (FIG. 8) located in the same plane as the pressure passages 22 so as to be displaced from the pressure passages 22 by 90° around the axis of the valve cavity 24.

A first service port 36 (FIGS. 2 and 10) in the base 12 is connected through holes 38 (FIG. 9) to an annular groove 40 (FIG. 9) similar to the groove 30. Other holes 42 (FIG. 7) lead from the groove 40 to service passages 44 (FIG. 8) located directly opposite one another on opposite sides of the valve cavity 24 so as to be located midway between the pressure passages 22 and the return passages 34. A second service port 46 (FIGS. 2 and 10) is similarly connected through holes 48 (FIG. 9) to a groove 50 and hence through other holes 52 to other service passages 54 (FIG. 8) which are also located on opposite sides of the valve cavity 24 midway between the pressure passages 22 and the return passages 34 so as to lie in the same plane perpendicular to the axis of the valve cavity 24 as these other passages. Preferably the passages 22, 34, 44 and 54 are all of the same cross-sectional dimension and configuration.

A cylindrical valve rotor 56 is located within the cavity 24; this rotor of course fits closely against the interior of this cavity. This valve rotor 56 includes in its periphery a plurality of notches 58 which are normally held so as to be directly opposite the pressure passages 22 and the return passages 34 in order to prevent fluid from flowing from any of these passages 22 or 34 into adjacent service passages 44 or 54 except when the complete valve 10 is deliberately opened in such a manner as to cause the rotor 56 to rotate slightly so as to connect the pressure passages 22 with either the service passages 44 or the service passages 54 and to simultaneously connect the return passages 34 with the other of these service passages.

The shapes of the edges of the notches 58 and of the ends of the passages 22, 34, 44 and 54 are considered quite important in obtaining a proper control of leakage at high pressures around the exterior of the rotor 56. As indicated diagrammatically in FIG. 11 of the drawings the edges of ends of the notches 58 have the shape of an isosceles trapezoid with the longer of the parallel sides above the lower of these sides. For convenience of illustration only the end of one of the passages 22 is shown in FIG. 11; as indicated in the preceding the ends of the passages 34, 44 and 54 are formed identically to the end of the passage 22. In FIG. 11 the edges of the end of a passage 22 are shown as having the shape of a similar isosceles trapezoid having the smaller of its parallel sides above the longer of its parallel sides. The non-parallel sides of these trapezoids are located at the same angles to the parallel sides, and their parallel sides are parallel.

This arrangement is designed so as to improve the linearity of the response obtained in the operation of the valve 10. With this type of construction when the rotor 56 is turned the non-parallel edges of the notches 58 in it slide across parallel, unparallel edges of the ends of the passages 22, 34, 44 and 54 as indicated in phantom in FIG. 11 so that parallelogram type of overlap openings are obtained permitting fluid flow. The dimensions of such openings can be controlled in the valve 10 by controlling the depth to which a plug 55 is forced within a cavity 57 constituting an extension of the cavity 24. A ball bearing 59 is normally located between the plug 55 and the rotor 56 as described in the co-pending application, Serial No. 766,168 indicated earlier in this specification. With this construction the amount of leakage around the rotor 56 at a null or neutral position may be varied to suit a user's specification by the simple expedient of regulating the depth of insertion of the plug 55 and, of course, the rotor 56 with respect to the cavities 57 and 24 respectively. This regulates the amount of overlap between the notches 58 and the passages 22, 34, 44 and 54 along the direction of the axis of the cavity 24.

The ability of the valve 10 to be adjusted so as to correct for leakage in its null or neutral position and so as to improve linearity of response is quite important from a commercial standpoint. Prior valves of a similar character not employing the type of construction explained herein have been virtually impossible to produce at a cost resembling a reasonable cost so as to meet certain specifications because of manufacturing problems. A valve rotor and a surrounding stator constructed as indicated in this specification can be manufactured so as to meet such specifications at a comparatively nominal cost. Further, prior similar devices have not contained a simple structure as explained herein for correcting leakage.

Since the passages 22, 34, 44 and 54 are machined the same as described above the rotor 56 may be rotated through 45° and will then be in a new null position. The isosceles trapezoids in the rotor will cover the load or service passages 22 and 34 as shown in FIG. 8, but when the rotor is rotated 45° the pressure and return passages 44 and 54 will be covered. Thus, there are eight neutral or null locations at which the rotor can be placed. This is important because all porting edges in the body passages 22, 34, 44 and 54 will not be identical and all the isosceles trapezoids in the rotor will not be identical; therefore, the rotor can be turned through 45° intervals and the combination of the best rotor position as determined by hydraulic characteristics can be used for selecting the final rotor position. Although the porting edges are cut on the same machine they will not be on the exact center line (tool wear, etc.) and the burrs after machining will not break off the same every time. With this construction it makes it possible to select the best rotor position to balance out the small edge irregularities that can be seen under microscope as mentioned above.

The valve cavity 24 extends from one side of the base 12 so as to in effect be open at the side of this base within the interior of a resilient, non-magnetic torque tube 60. This torque tube 60 preferably includes a more or less bell-shaped base 62 adapted to be attached directly to the base 12 by means of screws 64 so that an O-ring 66 held between it and the base 12 forms a seal preventing fluid from flowing into the cover 14 during the operation of the valve 10. The end of the torque tube 60 remote from the base 12 is attached through the use of a pin 68 (FIGS. 2 and 3) to a shaft 70 extending along the axis of the valve cavity 24 from the valve rotor 56. The adjacent ends of the torque tube 60 and the shaft 70 adjacent to the pin 68 are soldered or otherwise secured together so as to seal the interior of the torque tube 60 at this point so as to prevent leakage.

The pin 68 carries another tube 71 which is provided with parallel slots 72 (FIGS. 2 and 4) located on opposite sides of the axis of the shaft 70. These slots 72 carry portions 74 of a complete armature 76 formed out of iron or other similar ferromagnetic materials. The armature 76 includes ends 78 (FIGS. 2 and 4) located on opposite sides of the torque tube 60, which ends are connected together by generally U-shaped cross-bars 80. These ends 78 serve to carry coils 82 which are connected by wires 84 to a conventional connecting plug 86 mounted on the cover 14 used in connecting the entire valve 10 to an appropriate source of an electrical signal.

Within the cover 14 there is mounted a horseshoe-shaped permanent magnet 88 to the ends of which there are secured pole pieces 90 formed out of iron or equivalent ferromagnetic materials. The faces 91 on these pole pieces 90 are located adjacent to, but spaced from, the portions 74 of the armature 76. Preferably these pole pieces 90 and the ends of the magnet 88 are drilled and tapped so as to carry non-magnetic screws 92 which serve to limit the rotation of the armature 76 and prevent this armature from banging against the pole pieces 90. Further, preferably, the faces 91 on these pole pieces 90 are slanted slightly as indicated in FIG. 4 of the drawing so as to obtain a substantially uniform magnetic flux field across the adjacent portions of the armature 76.

For structural reasons it is normally preferred to incorporate upon the pole pieces 90 enlarged extremities 96 (FIG. 3) which are adapted to be secured by screws 98 to non-magnetic spacers 100 used in magnetically isolating the magnet 88 from the base or valve body and from the valve rotor 56 proper.

The use of the complete valve 10 is essentially very simple. Depending upon how it is desired to connect the ports 18 and 26 with the ports 36 and 46 an electrical signal is conveyed to the coils 82 in accordance with conventional practice. This, in turn, causes a change in the magnetic attraction of the magnet 88 for the armature 76, causing rotation of the valve rotor 56 in a corresponding manner, so as to connect through the notches 58 the desired ports. Such rotation of the armature 76 is against the spring-like tendency against twisting of the torque tube 60. When the signal to the coils 82 is stopped, this torque tube 60 will automatically twist back to its initial configuration placing the rotor 56 in the neutral position indicated in FIG. 8 of the drawings.

In order to provide for adjustment of the torque tube 60 so that the rotor 56 will automatically return to the correct "dead center" or closed position of the valve rotor 56 preferably the screws 64 fit through enlarged openings (not shown) in the base 62 so that the torque tube 60 can be rotated slightly as may be required for such adjustment purposes before being secured in a given position.

It will be realized that from the foregoing description the base 12 and the valve rotor 56 constitute what is, in effect, a complete balanced rotary valve in which the forces exerted upon the valve rotor 56 are always equal on opposite sides of this valve rotor so that there is no tendency for the valve rotor 56 to twist and bind so that it cannot be rotated, even when this complete valve is used with hydraulic fluid under extreme pressure. It will also be realized that the torque tube 60 employed in the complete valve 10 acts as a spring so as to always return back to an initial position the connected valve rotor 56, after the torque motor 16 has been operated. Strictly speaking this torque motor 16 includes the armature 76, the coils 82, the magnet 88 and the attached pole pieces 90. It will be realized that in this torque motor a great deal of variation in design is possible so as to achieve the type of results herein described.

Those skilled in the art to which this invention pertains will realize that the complete valve 10 is a very efficient device for the purpose intended, and is capable of reliable performance such as is required in many present day applications. They will further realize that this valve 10 may be constructed with a comparatively nominal amount of difficulty at a comparatively nominal cost. Because of the fact that the essential principles of operation employed in the valve 10 may be embodied in other differently appearing valves this invention is to be considered as being limited only by the appended claims forming a part of this disclosure.

I claim:

1. An electro-hydraulic servo valve which includes a valve body having an internal cavity formed therein and having a plurality of passages leading into the interior of said cavity, the ends of said passages leading into the interior of said cavity being spaced from one another; a valve rotor rotatably mounted within said cavity, said valve rotor fitting closely against the interior of said cavity and having notch means formed therein capable of connecting certain of said passages with other of said passages when said valve rotor is turned; shaft means for use in rotating said valve rotor connected to said valve rotor so as to have an end spaced from said valve rotor; torque tube means attached to said valve body so as to extend around said shaft means, said end of said shaft means remote from said valve body being secured to said torque tube means; and torque motor means mounted on said valve body, part of said torque motor means being connected to said shaft means, said torque motor means being responsive to an electrical signal so as to rotate said shaft and said valve rotor in order to operate said valve.

2. An electro-hydraulic servo valve which includes: a valve body having an internal cavity formed therein and having a pressure, return and service passages leading into the interior of said cavity, and a valve rotor rotatably positioned within said cavity, said valve rotor having the same shape as said cavity and fitting closely against the interior of said cavity, and having means formed therein capable of connecting certain of said passages with other of said passages when said valve rotor is turned, said passages leading into the interior of said cavity and said valve rotor being formed so that the pressure exerted on said valve rotor by hydraulic fluid within said passages is always equal on opposite sides of the axis of said valve rotor; a shaft connected to said valve rotor so as to extend therefrom along the axis of said valve rotor; a torque tube connected to said valve body so as to extend around said shaft, and extremity of said torque tube remote from said valve rotor being secured to said shaft; an armature mounted on said torque tube so as to be connected to said shaft through said torque tube; magnet means mounted on said valve body adjacent to said armature so as to affect the position of said armature; and coil means responsive to an electrical signal for moving said armature in order to rotate said shaft and said valve rotor.

3. An electro-hydraulic servo valve as defined in claim 2 wherein said coil means are mounted on said armature.

References Cited in the file of this patent

UNITED STATES PATENTS

| | | |
|---|---|---|
| 1,774,685 | Vickers | Sept. 2, 1930 |
| 2,738,450 | Matthews | Mar. 13, 1956 |
| 2,774,378 | Mekelburg | Dec. 18, 1956 |
| 2,822,821 | Gordon | Feb. 11, 1958 |
| 2,835,265 | Brandstadter | May 20, 1958 |
| 2,917,078 | Floyd | Dec. 15, 1959 |
| 2,917,080 | Hatch | Dec. 15, 1959 |
| 2,946,348 | North | July 26, 1960 |
| 2,961,002 | Gordon | Nov. 22, 1960 |